(No Model.)

C. GIBBS.
DUMPING CART.

No. 427,851.  Patented May 13, 1890.

WITNESSES:

INVENTOR:
C. Gibbs
BY Munn &Co.
ATTORNEYS

UNITED STATES PATENT OFFICE.

CHARLES GIBBS, OF NEW YORK, N. Y.

DUMPING-CART.

SPECIFICATION forming part of Letters Patent No. 427,851, dated May 13, 1890.

Application filed February 27, 1890. Serial No. 341,939. (No model.)

*To all whom it may concern:*

Be it known that I, CHARLES GIBBS, of New York city, in the county and State of New York, have invented a new and useful Improvement in Dump-Carts, of which the following is a full, clear, and exact description.

My invention relates to an improvement in dump-carts, and has for its object to provide a means whereby the load carried by the cart may be dumped conveniently and expeditiously, while the body of the cart remains in its normal or horizontal position.

Another object of the invention is to provide a means whereby the end-gate may be opened by the operator when stationed at the front of the cart, and also to provide a means whereby the load may be delivered from the body without opening the end-gate.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
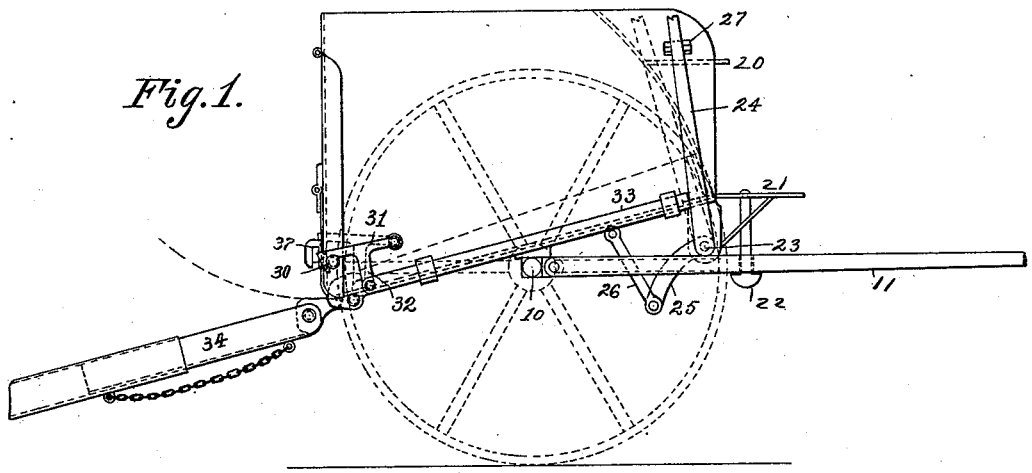
Figure 2:
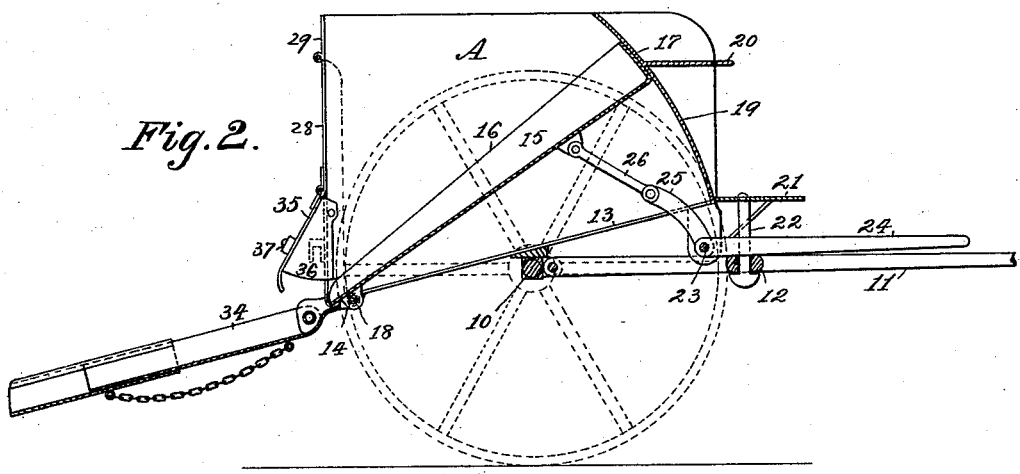
Figure 3:
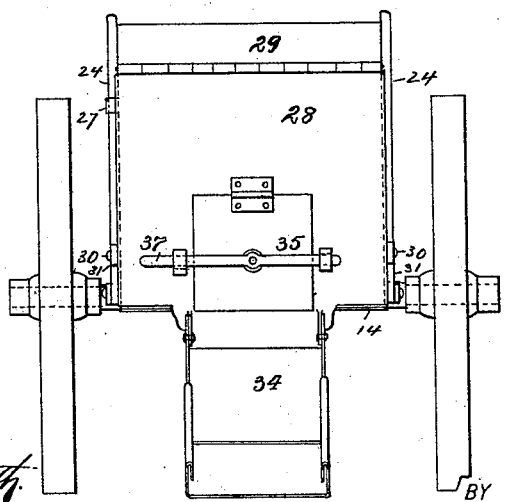

Figure 1 is a side elevation of a cart especially adapted for use as a coal-cart. Fig. 2 is a central vertical section through the cart as illustrated in Fig. 1, illustrating the mechanism whereby the coal may be delivered from the interior of the cart without opening the end-gate. Fig. 3 is an end view of the coal-cart.

To the axle 10 the shafts 11 are hinged, the cross-bar of which shafts may be provided, if desired, with a slot or opening, for a purpose hereinafter described.

The body A of the cart is deeper at the back than at the front, and each side-board of the said body is provided at its lower downwardly and rearwardly inclined edge with an inwardly-extending horizontal flange 13, and the said side-boards are further provided at their rear ends with a connecting or cross bar 14, secured to or formed integral with their under edges.

The bottom 15 of the body is adapted to have vertical movement, and the said bottom is provided with upwardly-extending side flanges 16, widest at their upper ends, and a front flange 17, connecting the said side flanges. This bottom 15 is adapted when in its normal position within the body to rest upon the side flanges 13, and the said bottom is pivotally attached within the body at its lower or rear extremity by pivotal pins 18, which pass through suitable lugs formed upon the movable bottom and through the side pieces of the body above the rear connecting-bar 14.

The front wall 19 of the body is concaved upon its inner face, as illustrated in Fig. 2, and convexed upon its outer face, and by reason of such construction the side-boards of the body extend beyond its curved front, and this space is utilized for the attachment of a seat 20, the upper convexed portion of the body-front constituting a comfortable back for said seat, and at the lower edge of the front of the body a foot-rest 21 is constructed, while to said foot-rest a bolt 22 is swiveled, adapted to enter the opening in the cross-bar 12 of the shafts, whereupon by turning the bolt-head transversely of the opening the body is effectually locked in a horizontal position. When occasion may require the body to be dumped, by turning the bolt-head in such manner that it will pass through the slot in the shaft cross-bar the rear of the body is free to drop downward in contact with the ground. This is effected by reason of the body being firmly attached to the axle and the axle pivoted or hinged to the shafts. The front flange 17 of the movable bottom is shaped to the inner contour of the front board 19 of the body.

In lugs projected downward from the front cross-bar, extending transversely of the body at its under side and upon which cross-bar the front of the bottom 15 rests when in its normal position, a rock-shaft 23 is journaled, the said rock-shaft being provided at each end with a lever-arm 24, capable of extending vertically upward, one at each side of the body, and to the rock-shaft at or near its center a downwardly and rearwardly extending arm 25 is rigidly secured, which arm is preferably curved, and the lower extremity of said arm is connected with the bottom 15 of the body forward of the axle by a suitable link or pitman 26. Thus by carrying the levers 24 downward to a horizontal position the bottom 15 of the body is forced upward to a decidedly inclined position, as shown in Fig. 2, whereupon the contents of the body are enabled to run off quickly when the end-gate is opened or the load is thrown in contact with the end-gate when the latter is closed. When the lever-arms 24 are carried to their vertical position, (shown in Fig. 1,) the bottom is restored simultaneously to its normal position, and the said levers may be locked in their vertical position by means of any suitable form of latch, one construction being illustrated at 27 in Fig. 1.

The end-gate 28 is hinged at its upper end to a back board 29, attached to the rear ends of the side-boards near the top. The end-gate is provided at each side with a pin 30, each of the said pins being adapted for engagement by a latch 31, pivoted at its forward end, one to the outer face of each side-board of the body, each of which latches is provided at or near its center with a downwardly-extending shank 32, and the lower end of the shank of each latch is pivotally attached to a trip-bar 33, one of said trip-bars being held horizontally in suitable brackets upon the outer face of each side-board at or near the bottom thereof.

When the latches are locked upon the pins 30 of the end-gate and it is desired to open said end-gate, by carrying the lever-arms 24 when in their vertical position a slight distance in the direction of the rear the said arms are brought into engagement with the forward ends of the sliding trip-bars 33, and the said trip-bars are forced rearward, whereby the latches are lifted from connection with the pins and the weight of the material in the body opens the end-gate. When the load is dumped and the end-gate closes or is closed, the weight of the latches 31 causes them to contact with the pins 30 of the end-gate by gravity.

In dumping a load from the cart, if the load is to be dumped quickly, the lever-arms 24 are carried in contact with the sliding trip-bars 33, as above stated, to release the end-gate, and the lever-arms are then carried downward to the horizontal position, whereby the bottom 15 of the body is elevated at the front and the contents caused to rapidly travel downward in the direction of the rear. If, however, the coal or contents of the cart are to be delivered to a point somewhat removed from the end of the cart, the usual telescopic chute 34 is pivoted to the bottom of the end-gate at or near its center beneath an opening formed therein, which opening is normally closed by a swing-door 35, hinged at its upper end, which door is provided with side pieces 36, as illustrated in Fig. 2, to prevent the coal from escaping sidewise or to compel all the coal to pass downward in the chute, and the said door is further provided with any approved form of latch-bar 37.

I desire it to be distinctly understood that while details of construction have been shown and described equivalent construction may be employed without departing from the spirit of the invention.

Having thus described my invention, I claim as new and desire to secure by Letters Patent—

1. The combination, with a cart-body, of a bottom pivoted thereto at its rear end and provided with a hoisting mechanism at its front end, substantially as and for the purpose specified.

2. The combination, with the body of a cart and a bottom pivoted therein at one end, of a rock-shaft, lever-arms connected with said rock-shaft at its extremities, an arm projected downward from the said rock-shaft intermediate of its ends, and a link-connection between the said arm and the front end of the bottom of the body, substantially as shown and described, and for the purpose specified.

3. The combination, with a cart-body having the inner face of its front board concaved and inwardly-extending flanges secured to the bottom of the body at its sides and ends, of a bottom pivoted at one end within the body, provided with an upper flange curved to the contour of the front board of the body and side flanges, and means for elevating the free end of the bottom, substantially as shown and described.

4. The combination, with a cart-body and an end-gate hinged thereto, provided with attached keepers, of a gravity-latch pivoted to the side-boards of the body and adapted for engagement with the keepers, a sliding trip-bar pivotally attached to each latch, and means, substantially as shown and described, for sliding the said trip-bars rearward, as and for the purpose specified.

5. The combination, with a cart-body and an end-gate hinged thereto, provided with attached keepers, of a gravity-latch pivoted to the side-boards of the body and adapted for engagement with the keepers, a sliding trip-bar pivotally attached to each latch, and levers pivoted to the sides of the cart-body and adapted for contact with the free ends of the sliding trip-bars, substantially as shown and described.

6. The combination, with a cart-body provided with a hinged end-gate having attached keepers and a bottom pivoted at its lower end only within the body, of a rock-shaft journaled beneath the forward portion of the body and having a lever-arm secured to each extremity, an arm projected downward and rearward from the said rock-shaft intermediate of its ends, a link-connection between the said intermediate arm and the under face of the said bottom, a gravity-latch pivoted to the side-boards near the end-gate and adapted for engagement with the keepers thereof, a shank projected downward from the under side of each latch, and a trip-bar held to slide upon each outer side face of the body, the said trip-bars being pivoted at one end to the shanks of the latches and adapted for engagement at their opposite extremities with the lever-arms of the rock-shaft, substantially as and for the purpose specified.

CHARLES GIBBS.

Witnesses:
J. F. ACKER, Jr.,
C. SEDGWICK.